Oct. 22, 1946.　　　　S. J. SMITH　　　　2,409,963
MOVING COIL ELECTRICAL INSTRUMENT
Filed Feb. 17, 1944
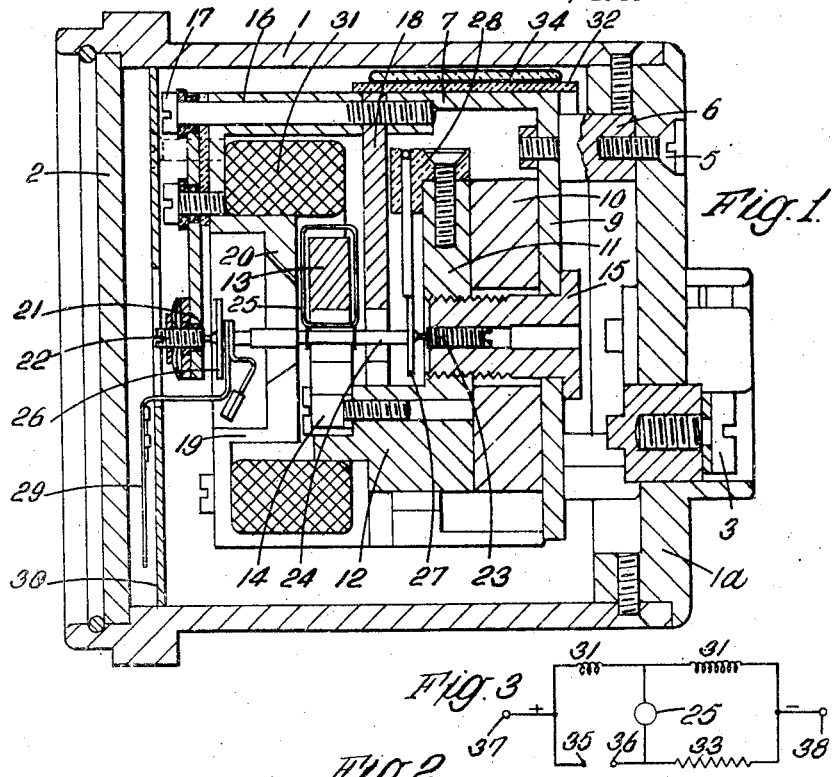
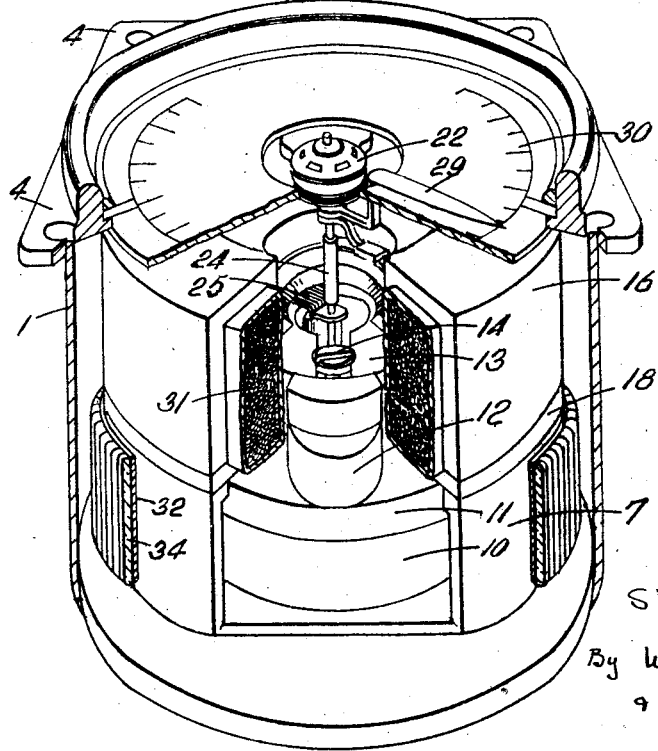
INVENTOR
Stanley J. Smith
By Watson, Cole, Grindle & Watson
ATTYS Patented Oct. 22, 1946

2,409,963

UNITED STATES PATENT OFFICE 2,409,963

MOVING-COIL ELECTRICAL INSTRUMENT

Stanley James Smith, London, England, assignor to Simmonds Aerocessories Limited, London W. C. 2, England Application February 17, 1944, Serial No. 522,832
In Great Britain March 5, 1943

8 Claims. (Cl. 171—95)

The present invention relates to moving coil electromagnetic instruments such as may be used as voltmeters, ammeters and the like.

While the majority of such instruments are so constructed that the movement of the coil is limited to an arc of some 90° some constructions have been proposed in which a movement of about 300° is possible. Such instruments were however expensive to construct and, owing to the arrangement of the magnetic field, comparatively inefficient. For many purposes however a scale deflection of some 300° is desirable and it is accordingly one object of the present invention to provide an improved form of such instrument which shall be relatively simple and inexpensive in construction.

A further object of the invention is to provide an instrument of the ohmmeter type which is self compensating as regards fluctuation in the source of potential used to operate the instrument.

Other objects and advantages of the present invention will become apparent during the course of the following description of one form of the invention with reference to the accompanying drawing in which—

Fig. 1 is a cross section of an improved instrument in accordance with the invention, Fig. 2 is a perspective view of the same instrument with parts thereof shown cutaway to show more clearly the construction thereof, and Fig. 3 is a wiring diagram of the electrical connections in the instrument.

Referring to Figs. 1 and 2 the improved instrument is shown secured to the detachable end wall 1a of a moulded cover 1 which is provided with a glass window 2, terminals 3 and mounting flanges 4. The instrument comprises a cylindrical casing 7 of a suitable ferro-magnetic material which is closed at one end by wall 9 to which is secured a permanent magnet 10. Covering the face of the magnet is the foot 11 of a pillar 12 to the upper end of which a split ring shaped member 13 is secured by screw 14. The magnet 10 and pillar 12 are secured to the end wall 9 of the casing 7 by means of the bolt 15 which passes through an aperture in the magnet and screws into the foot 11 of the pillar 12. The casing 7 is provided with an extension 16 which is secured thereto by bolts 17 and secured therebetween is a plate 18 which extends inwardly and is formed with a central aperture of the same diameter as the internal diameter of the ring member 13. The outer face of the extension 16 is formed with a downwardly depending flange 19 which extends inwardly to form a portion 20 parallel with the ring shaped member 13 which is also formed with an aperture of the same diameter. Secured to the outer face of the extension 16 of the casing is an arm 21 which carries at its end an adjustable pivot 22. A second pivot 23 is housed in an aperture in the bolt 15. Mounted in the pivots is a spindle 24 to which is attached one side of a coil 25 which embraces the ring shaped member 13. Connections to the coil 25 are made through hair spring 26 connected to arm 21 which is insulated from the casing extension 16 and through hair spring 27 which is secured to an insulating block 28. The spindle 24 carries a pointer 29 which travels over a fixed scale 30. Located in the space formed between the sides of the casing extension 16 and the plate 18 is an annular magnetizing coil 31 and secured round the periphery of the casing 7 is a strip of insulating material 32 on which is secured a resistance 33 wound on a further strip of insulating material 34.

It will be appreciated that, as shown more particularly in Fig. 2, one side of the casing 7 and of the extension 16 thereof is cut away over an angle of some 60° and a sector shaped piece of similar size is also cut out of plate 18 in order that a sufficient air gap may be provided between these parts and the pillar 12.

The electrical connections of the instrument are shown in Fig. 3. The terminals indicated generally in Fig. 1 by reference numeral 3 comprise two terminals 37 and 38 for connection to a source of direct current and two terminals 35 and 36 for connection with a resistance to be measured. The magnetizing coil 31 is connected directly between terminals 37 and 38 and the resistance 33 between terminals 36 and 38, while the moving coil 25 is connected between a tapping on the magnetizing coil 31 and terminal 36.

The arrangement operates as follows. Referring to Fig. 1 it will be seen that the moving coil 25 is subjected to the influence of two magnetic fields, i. e. that of the permanent magnet 10 and that of the electromagnet 31. Considering first the field due to the permanent magnet and assuming that the outer face of the magnet (the left hand surface in Fig. 1) is north it will be seen that the flux travels in two paths, one through pillar 12, ring member 13, the right hand side of coil 25, plate 18, the casing 7 and end wall 9 back to the magnet 10, and the other through pillar 12, ring member 13, the left hand side of coil 25, parts 20 and 19 of the casing extension 16, casing 7 and end wall 9. Both these flux paths produce an additive effect on the coil 25, and assuming current to flow clockwise in this coil, tend to cause it to rotate on its spindle 24 downwards below the plane of the paper. Considering now the field of the electromagnet and assuming the coil 31 is so connected with a source of potential that the portion 20 of the casing extension 16 is north, it will be seen that there are two possible flux paths, one through the left hand side of coil 25, ring member 13, pillar 12, magnet 10, the end wall 9, casing 7, the casing extension 16 and the flange 19. The other path extends through the left hand side of coil 25, ring member 13, the right hand side of coil 25, plate 18, casing extension 16 and flange 19. Assuming again that the current flowing in coil 25 is in a clockwise direction the flux in the first of these paths tends to move coil 25 upwards out of the plane of the paper whereas the flux in the second of these paths produces an equal and opposite effect on the different sides of the coil and hence has no effect. It will be seen therefore that the total effects of the permanent magnet and electromagnet on the coil are in opposition. The electromagnet and permanent magnet are, however, so designed that the predominating effect is that of the permanent magnet. Thus for a given current flowing in the coil the torque exerted will be a maximum if the electromagnet is not energised and will decrease in proportion as the current in the electromagnet is increased. In other words the instrument corresponds to a permanent magnet moving coil instrument of normal design in which means is provided for varying the total magnetic flux operating on the coil.

When used as an ohmmeter the improved instrument operates as follows. Assuming that the moving coil 25 is connected in series with a fixed resistance and a source of direct current and that the electromagnetic circuit is not energised it will be appreciated that under these conditions the deflection of the coil will be affected by the voltage of the source, and will increase as this voltage increases. If now the magnetizing coil 31 is connected across the source an increase in voltage of the source which causes a greater current to flow through the moving coil 25 will also cause a greater current to flow through the magnetizing coil 31. This however acts to decrease the deflection and consequently by a suitable adjustment of the size of the magnetizing coil the deflection of the moving coil may be held constant despite variations in the voltage of the source. Fig. 3 shows a preferred circuit arrangement in which the moving coil is connected in a bridge circuit constituted by the two parts of the magnetizing coil 31, a fixed resistance 33 and a resistance to be measured which is connected with terminals 35, 36 and may be, for example, a resistance thermometer. Such an arrangement, by the use of the improved instrument of the inventor, may be adjusted to be completely independent of the voltage of the direct current source connected with terminals 37, 38.

While the improved instrument of the invention finds its primary use as an ohmeter in the manner described above, it may also be used as a normal moving coil instrument such as a voltmeter with or without modification. For example it is sufficient to omit the magnetizing coil 31. Since however with the aid of improved magnetic materials such as "Alnico" for the permanent magnet it is possible to obtain very high flux densities in the airgaps, a sufficiently sensitive instrument may be obtained by omitting the casing extension 16 so that only one side of the coil is operated on by the flux between the ring member 13 and plate 18. Greater sensitivity may of course be obtained by extending the pole face to cover more than one side of the moving coil.

It will be appreciated that the instrument of the present invention provides not only a moving coil device having a total deflection of some 300° which is more efficient than devices of this nature that have hitherto been available, but also an ohmeter or similar instrument that is self compensating as regards fluctuating in potential of a source of direct current.

I claim:

1. A moving coil electrical instrument comprising a cylindrical casing of magnetic material closed at one end, a cover plate secured to the open end of said casing formed with a circular aperture concentric with the said casing; a permanent magnet secured to the closed end of the casing, a pillar extending from said magnet parallel with the axis of the casing but displaced therefrom, a ring shaped member mounted on the end of said pillar and extending in a plane parallel with the said cover plate and concentric with the casing, and a moving coil embracing said ring member and mounted on one side on a spindle arranged co-axially with said casing.

2. A moving coil electrical instrument comprising a cylindrical casing of magnetic material closed at one end, a disc shaped permanent magnet secured concentrically to the inner end wall of the casing, a pillar extending axially from the magnet, a ring shaped member secured to said pillar, a coil embracing said ring shaped member and mounted for rotation on a spindle extending along the axis of said casing and an apertured cover plate secured to the open end of the casing and extending over a face of the said ring shaped member to form therewith co-operating pole pieces between which said coil rotates.

3. A moving coil electrical instrument comprising a ring shaped pole piece, a single coil embracing said pole piece and mounted for rotation thereabout on an axis concentric with the axis of said pole piece, a first magnetic circuit, including a permanent magnet, extending between said ring shaped pole piece and a first pole piece arranged on one side of the said coil, and a second magnetic circuit, including an electromagnet, extending between said ring shaped pole piece and a second pole piece arranged at another side of the said coil.

4. A moving coil electrical instrument comprising a cylindrical casing closed at one end, a permanent magnet secured to the inner end wall of the casing, a pillar having a foot secured to the outer face of said magnet extending axially of the casing, a ring shaped member secured at a point on its periphery to said pillar and extending in a plane normal to the axis of said casing, a coil embracing the said ring member and mounted for rotation about an axis parallel with the axis of said casing, an inwardly directed flange on said casing extending behind said ring member and parallel therewith, the said flange being formed with a central aperture equal in diameter to and concentric with the aperture in the said ring member and having a sector shaped portion cut away to clear the said pillar, a second flange extending inwardly from said casing over the outer face of said ring member and formed with an aperture equal in diameter to and concentric with the aperture in the ring member, the said flanges, the casing and the side wall of the ring member defining an annular recess accommodating an energising coil.

5. An ohmeter comprising a permanent magnet, a single coil movable in a magnetic field set up by said permanent magnet, an electromagnet associated with said permanent magnet for varying the flux density in said field, supply terminals for connection with a source of direct current, an energising winding for said electro-magnet connected between said terminals, a tapping on said winding connected with one end of said coil, a fixed resistance connected between one of said terminals and the other end of said coil and a pair of terminals for connection with a resistance to be measured connected respectively with the join of said coil and said resistance and the other of said supply terminals.

6. An instrument of the ohmmeter type comprising a permanent magnet establishing a magnetic field across two air gaps, a single coil having two sides each of which moves in one of said air gaps, means for applying to said coil a current which is a function of the magnitude of a resistance to be measured, and means for compensating said instrument against variations in potential of the source of said current, said last named means comprising an electro-magnet so disposed relative to said permanent magnet, and so connected with said source, as to set up a resultant magnetic field across one of said air gaps only in opposition to the magnetic field set up across such air gap by said permanent magnet.

7. A moving coil electrical instrument comprising a permanent magnet establishing a magnetic field across two air gaps, a single coil having two sides each of which moves in one of said air gaps, and an electro-magnet for setting up a resultant magnet field in one only of said air gaps to control the total flux density therein.

8. A moving coil electrical instrument comprising a ring shaped pole piece, a single coil embracing said pole piece and mounted for rotation thereabout on an axis concentric with the axis of said pole piece, a first pole piece associated with said ring shaped pole piece with one side of said coil therebetween, a second pole piece associated with said ring shaped pole piece with another side of said coil therebetween, a first magnetic circuit including a permanent magnet extending between said ring shaped pole piece and said first and second pole pieces, and a second magnetic circuit including an electromagnet extending between said ring shaped pole piece and one of said first and second pole pieces.

STANLEY JAMES SMITH.